United States Patent
Guo et al.

(10) Patent No.: US 10,823,638 B2
(45) Date of Patent: Nov. 3, 2020

(54) MONITORING METHOD AND MONITORING APPARATUS FOR DETERMINING REMAINING LIFE OF A BEARING

(71) Applicant: Schaeffler Technologies AG & Co. KG, Herzogenaurach (DE)

(72) Inventors: Lei Guo, Shanghai (CN); Gefei Bu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 105 days.

(21) Appl. No.: 16/318,142

(22) PCT Filed: Sep. 6, 2017

(86) PCT No.: PCT/CN2017/100661
§ 371 (c)(1),
(2) Date: Jan. 16, 2019

(87) PCT Pub. No.: WO2018/050008
PCT Pub. Date: Mar. 22, 2018

(65) Prior Publication Data
US 2019/0250066 A1    Aug. 15, 2019

(30) Foreign Application Priority Data

Sep. 19, 2016   (CN) .......................... 2016 1 0833422

(51) Int. Cl.
*G01M 13/04*   (2019.01)
*G01M 13/045*  (2019.01)

(52) U.S. Cl.
CPC .......... *G01M 13/045* (2013.01); *G01M 13/04* (2013.01)

(58) Field of Classification Search
CPC ........................... G01M 13/04; G01M 13/045
(Continued)

(56) References Cited

U.S. PATENT DOCUMENTS 5,210,704 A  *  5/1993  Husseiny ............... G01H 1/003
                                                            702/34
9,906,473 B2 *  2/2018  Toyoda .................. G06Q 50/10
(Continued)

FOREIGN PATENT DOCUMENTS

CN          1659427 A        8/2005
CN        102221473 A       10/2011
(Continued)

OTHER PUBLICATIONS

"Dynamic Prediction of Rolling Bearing Defect Extension; Foreign Bearing Technology; Dec. 31, 2000; pp. 41-47." (Year: 2000).*
(Continued)

*Primary Examiner* — Jacques M Saint Surin

(57) ABSTRACT

A monitoring method and monitoring apparatus for the remaining life of a bearing are provided. The monitoring method comprises: during the operation of a bearing, determining a position where a defect of the bearing is located, and determining a size of the defect (S10); according to the position where the defect is located and a set condition, determining a failure mode of the bearing as well as an expansion rate and a failure value of the defect in the failure mode (S20), the failure value being a maximum value that the defect can reach when the bearing fails; and based on the size, expansion rate and failure value of the defect, obtaining the remaining life of the bearing (S30). The monitoring method and monitoring apparatus determine the remaining service life of a bearing, so that maintenance personnel can arrange a maintenance plan and counter measures in advance.

20 Claims, 4 Drawing Sheets

(58) Field of Classification Search
USPC .......................................................... 73/579
See application file for complete search history.

(56) References Cited

U.S. PATENT DOCUMENTS

| | | |
|---|---|---|
| 2002/0046012 A1 | 4/2002 | Takemura et al. |
| 2009/0093975 A1* | 4/2009 | Judd ..................... G01H 13/00 |
| | | 702/34 |
| 2013/0298704 A1* | 11/2013 | Ito ........................ G01M 13/04 |
| | | 73/865.8 |
| 2015/0168255 A1* | 6/2015 | Hamilton .............. F16C 41/004 |
| | | 73/593 |

FOREIGN PATENT DOCUMENTS

| | | |
|---|---|---|
| CN | 102597734 A | 7/2012 |
| CN | 103328947 A | 9/2013 |
| DE | 102004048649 A1 | 4/2006 |

OTHER PUBLICATIONS

Li, Y. et al.; Conclusion "Dynamic Prediction of Rolling Bearing Defect Extension"; Foreign Bearing Technology; Dec. 31, 2000; pp. 41-47.

* cited by examiner

MONITORING METHOD AND MONITORING APPARATUS FOR DETERMINING REMAINING LIFE OF A BEARING

CROSS-REFERENCE TO RELATED APPLICATION

The present application is the U.S. national stage application pursuant to 35 U.S.C. § 371 of International Application No. PCT/CN2017/100661, filed Sep. 6, 2017, which application claims priority from Chinese Patent Application No. 201610833422.6 filed on Sep. 19, 2016, which applications are incorporated herein by reference in their entireties.

TECHNICAL FIELD

The present disclosure relates to the field of bearings, and specifically, to a monitoring method and monitoring apparatus for determining the remaining life of a bearing.

BACKGROUND

Bearings play an indispensable role in the machinery. The operating status of a bearing has direct influence on the performance of a system that the bearing serves (that is, machinery equipment where the bearing is located). Therefore, the status of the bearing during operation needs to be monitored, and an alarm is sent when the bearing is abnormal.

There are various existing methods for monitoring whether a rolling bearing is in an abnormal state. A first method is to determine whether the bearing is in an abnormal state by collecting the temperature of the bearing, where when the temperature of the bearing reaches a set threshold, it is determined that the bearing is in an abnormal state, and an alarm is sent. A second method is to determine whether the bearing is in an abnormal state by collecting a vibration parameter of the bearing such as the amplitude and frequency of vibration, where when the vibration parameter exceeds a set threshold, it is determined that the bearing is in an abnormal state, and an alarm is sent.

SUMMARY

The problem to be solved by the present disclosure is that existing methods for monitoring the status of a bearing cannot determine the remaining service life of the bearing and thus maintenance personnel cannot arrange a maintenance plan and counter measures in advance.

To solve the problem, the present disclosure provides a monitoring method for determining the remaining life of a bearing, including: during the operation of the bearing, determining the position where a defect of the bearing is located, and determining the size of the defect; according to the position where the defect is located and a set condition, determining a failure mode of the bearing as well as an expansion rate and a failure value of the defect in the failure mode, the failure value being a maximum value that the defect can reach when the bearing fails; and based on the size, expansion rate and failure value of the defect, determining the remaining life of the bearing.

In an example embodiment, determining the position where a defect of the bearing is located includes: acquiring a vibration signal of the bearing, the vibration signal including a vibration frequency and amplitude of the bearing; and performing frequency domain analysis on the vibration signal to determine the position where the defect is located.

In an example embodiment, determining the position where a defect of the bearing is located includes: acquiring an acoustic emission signal of the bearing, the acoustic emission signal including a frequency and amplitude of an acoustic wave generated by the bearing; and performing frequency domain analysis on the acoustic emission signal to determine the position where the defect is located.

In an example embodiment t, determining the size of the defect includes: determining a relative rotational speed of a rolling element of the bearing with respect to an inner race or outer race; determining a time required for the rolling element to go through the defect; and calculating the size of the defect according to the relative rotational speed and the time.

In an example embodiment, determining a time required for the rolling element to go through the defect includes: acquiring a vibration signal of the bearing, the vibration signal including a vibration frequency and amplitude of the bearing; and performing time domain analysis on the vibration signal to determine the time required for the rolling element to go through the defect, the time being an interval between a moment at which the rolling element reaches the defect and a moment at which the rolling element leaves the defect.

In an example embodiment, determining a time required for the rolling element to go through the defect includes: acquiring an acoustic emission signal of the bearing, the acoustic emission signal including a frequency and amplitude of an acoustic wave generated by the bearing; and performing time domain analysis on the acoustic emission signal to determine the time required for the rolling element to go through the defect, the time being an interval between a moment at which the rolling element reaches the defect and a moment at which the rolling element leaves the defect.

In an example embodiment, before determining the position where a defect of the bearing is located, and determining the size of the defect, the monitoring method further includes determining whether the bearing has a defect: acquiring a value of an operating parameter of the bearing during the operation, the operating parameter of the bearing including one or more of temperature of the bearing, vibration frequency and amplitude of the bearing, and rotational speed of the bearing; and determining that the bearing has a defect when one or more of the values of the operating parameters are abnormal.

In an example embodiment, before acquiring a value of an operating parameter of the bearing, the monitoring method further includes: detecting the value of the operating parameter of the bearing.

In an example embodiment, the monitoring method further includes diagnosing whether the value of the operating parameter is abnormal: acquiring a criterion value of the operating parameter; and comparing the value of the operating parameter and the criterion value of the operating parameter to determine a difference, and when the difference exceeds a set range, determining that the operating parameter is abnormal.

In an example embodiment, when the bearing has no defect, a load of the bearing is determined, and the remaining life of the bearing is determined according to the load and a dynamic load rating of the bearing.

In an example embodiment, determining a load of the bearing includes: determining an equivalent load on the bearing during the operation, and using the equivalent load as the load.

In an example embodiment, determining a load of the bearing includes: determining a real-time load on the bearing during the operation, and using the real-time load as the load.

The present disclosure further provides a monitoring apparatus for the remaining life of a bearing, including: a defect determining unit configured to: during the operation of the bearing, determine the position where a defect of the bearing is located, and determine the size of the defect; a failure determining unit configured to: according to the position where the defect is located and a set condition, determine a failure mode of the bearing as well as an expansion rate and a failure value of the defect in the failure mode, the failure value being a maximum value that the defect can reach when the bearing fails; and a first calculation unit configured to determine the remaining life of the bearing based on the size of the defect determined by the defect determining unit and the expansion rate and the failure value determined by the failure determining unit.

In an example embodiment, the defect determining unit includes: a vibration acquiring module configured to acquire a vibration signal of the bearing, the vibration signal including a vibration frequency and amplitude of the bearing; and a vibration analysis module configured to perform frequency domain analysis on the vibration signal acquired by the vibration acquiring module to determine the position where the defect is located.

In an example embodiment, the defect determining unit includes: an acoustic wave acquiring module configured to acquire an acoustic emission signal of the bearing, the acoustic emission signal including a frequency and amplitude of an acoustic wave generated by the bearing; and an acoustic wave analysis module configured to perform frequency domain analysis on the acoustic emission signal acquired by the acoustic wave acquiring module to determine the position where the defect is located.

In an example embodiment, the defect determining unit includes: a rotational speed determining module configured to determine a relative rotational speed of a rolling element of the bearing with respect to an inner race or outer race; a time determining module configured to determine a time required for the rolling element to go through the defect; and a calculation module configured to calculate the size of the defect based on the relative rotational speed determined by the rotational speed determining module and the time determined by the time determining module.

In an example embodiment, the time determining module includes: a first acquiring submodule configured to acquire a vibration signal of the bearing, the vibration signal including a vibration frequency and amplitude of the bearing; and a first analysis submodule configured to perform time domain analysis on the vibration signal acquired by the first acquiring submodule to determine the time required for the rolling element to go through the defect, the time being an interval between a moment at which the rolling element reaches the defect and a moment at which the rolling element leaves the defect.

In an example embodiment, the time determining module includes: a second acquiring submodule configured to acquire an acoustic emission signal of the bearing, the acoustic emission signal including a frequency and amplitude of an acoustic wave generated by the bearing; and a second analysis submodule configured to perform time domain analysis on the acoustic emission signal acquired by the second acquiring submodule to determine the time required for the rolling element to go through the defect, the time being an interval between a moment at which the rolling element reaches the defect and a moment at which the rolling element leaves the defect.

In an example embodiment, the monitoring apparatus includes a defect judging unit configured to determine whether the bearing has a defect. The defect judging unit includes: a parameter acquiring module configured to acquire a value of an operating parameter of the bearing during the operation of the bearing, the parameter including one or more of temperature of the bearing, vibration frequency and amplitude of the bearing, and rotational speed of the bearing; and a determining module configured to determine that the bearing has a defect when one or more of the values of the operating parameters acquired by the parameter acquiring module are abnormal.

In an example embodiment, the monitoring apparatus includes a detection unit configured to detect the value of the operating parameter of the bearing before the value of the operating parameter of the bearing is acquired.

In an example embodiment, the defect judging unit includes a criterion acquiring module configured to acquire a criterion value of the operating parameter. The determining module is configured to compare the value of the operating parameter of the bearing acquired during the operation of the bearing and the criterion value of the operating parameter acquired by the criterion acquiring module to determine a difference, and when the difference exceeds a set range, determine that the operating parameter is abnormal.

In an example embodiment, the monitoring apparatus includes: a load determining unit configured to determine a load of the bearing when the bearing has no defect; and a second calculation unit configured to determine the remaining life of the bearing according to the load determined by the load determining unit and a dynamic load rating of the bearing.

In an example embodiment, the load determining unit is configured to determine an equivalent load on the bearing during the operation, and use the equivalent load as the load.

In an example embodiment, the load determining unit is configured to determine a real-time load on the bearing during the operation, and use the real-time load as the load.

Compared with the prior art, the technical solutions of the present disclosure have at least the following advantages. During the operation of a bearing: if the bearing has a defect, the size of the defect is determined based on the position of the defect; a failure mode and a failure value of the bearing and an expansion rate of the defect are determined according to the position where the defect is located and a set condition; and the remaining life of the bearing is calculated according to the size, the expansion rate, and the failure value of the defect. Therefore, maintenance personnel can arrange a maintenance plan and counter measures in advance according to the detected remaining life of the bearing, thereby eliminating unexpected failure and downtime and improving safety of the system that the bearing serves.

BRIEF DESCRIPTION OF THE DRAWINGS

The disclosure will be explained in greater detail below on the basis of figures. The figures show the following.

DESCRIPTION

To make the objectives, features, and advantages of the present disclosure more comprehensible, specific example embodiments of the present disclosure are described in detail below with reference to the accompanying drawings.

Figure 1:
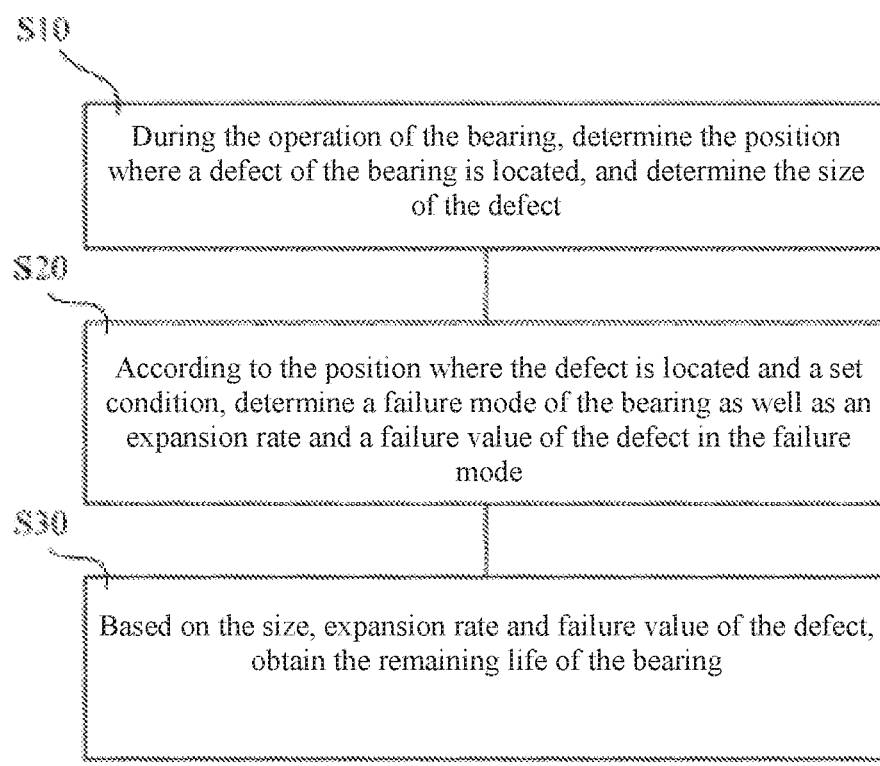
FIG. 1 is a principle diagram of a monitoring method according to an embodiment of the present invention.

The present disclosure provides a monitoring method for the remaining life of a bearing. Referring to FIG. 1, the monitoring method includes the following steps:

- S10: During the operation of the bearing, the position where a defect of the bearing is located is determined, and the size of the defect is determined.
- S20: According to the position where the defect is located and a set condition, a failure mode of the bearing under a working condition during the operation as well as an expansion rate and a failure value of the defect in the failure mode are determined, the failure value being a maximum value that the defect can reach when the bearing fails.
- S30: The remaining life of the bearing is determined based on the size, expansion rate and failure value of the defect.

It should be noted that the bearing in the above method is generally a rolling bearing. For a rolling bearing, during the operation of the bearing, the position that is most likely to have a defect is a rolling surface in rolling contact inside the bearing, including a raceway of an inner race, a raceway of an outer race, a rolling element, and a cage of the bearing. Therefore, the position where the defect is located generally includes, but is not limited to, the inner race, the outer race, the rolling element, and the cage. In an example embodiment, the method for determining the remaining life of the bearing is set forth mainly by using the occurrence of a defect on the inner race and the outer race as an example.

The set condition generally refers to accumulated experience in the industry. In practice, generally, once the position of the defect is determined, the failure mode can be derived from empirical data accumulated in the industry, and then the expansion rate and the failure value of the defect in the failure mode can be determined. Types of failure modes include contact fatigue failure, wear-out failure, fracture failure, plastic failure, corrosion failure and the like.

In different failure modes, the expansion rate of the defect may vary, and the failure value of the defect that the bearing can endure, namely, the maximum value of the defect, also varies. In practice, in a specific failure mode, the expansion rate of the defect and the failure value of the defect can be determined according to empirical data accumulated in the industry. For example, in the contact fatigue failure mode, when the area of the defect reaches 5% to 6% of the contact area, it is determined that the bearing fails, and the defect area in this case is the failure value.

When the size, the expansion rate, and the failure value of the defect are determined, a time required for the defect to propagate to the failure value can be calculated. Then, the remaining number of turns the bearing can rotate is calculated according to the rotational speed of the bearing and the time required for the defect to propagate to the failure value, thus determining the remaining life of the bearing. Alternatively, the remaining life of the bearing can also be measured directly based on the time required for the defect to propagate to the failure value.

Therefore, in the present disclosure, during the operation of a bearing, if the bearing has a defect: the size of the defect is determined based on the position of the defect; a failure mode and a failure value of the bearing and an expansion rate of the defect are determined according to the position where the defect is located and a set condition; and the remaining life of the bearing is calculated according to the size, the expansion rate, and the failure value of the defect. Therefore, maintenance personnel can arrange a maintenance plan and counter measures in advance according to the detected remaining life of the bearing, thereby improving safety of the system that the bearing serves.

Steps S10 to S30 are described in detail below.

Step S10: During the operation of the bearing, the position where a defect of the bearing is located is determined, and the size of the defect is determined. For a first sub-step of step S10, determine the position where the defect of the bearing is located. In this portion of step S10, the position where the defect is located is determined by using a vibration analysis method, an acoustic emission analysis method, or other methods. In an example embodiment, the method for acquiring the defect of the position is described by using the vibration analysis method and the acoustic emission analysis method as examples.

In the vibration analysis method, first, a vibration signal of the bearing is acquired, the vibration signal including a vibration frequency and amplitude of the bearing; and then, frequency domain analysis is performed on the vibration signal to determine the position where the defect is located.

In the acoustic emission analysis method, first, an acoustic emission signal of the bearing is acquired, the acoustic emission signal including a frequency and amplitude of an acoustic wave generated by the bearing; and then, frequency domain analysis is performed on the acoustic emission signal to determine the position where the defect is located.

For both the vibration analysis method and the acoustic emission analysis method, the initially determined vibration signal or acoustic emission signal is generally a time domain signal representing the change state of the amplitude of the vibration or acoustic wave with time. To determine the position of the defect, the time domain signal needs to be converted into a vibration spectrum or an acoustic emission spectrum, and the failure frequency is analyzed according to the spectrum determined through conversion. If the characteristic frequency of a component is close to the failure frequency, the component has a defect.

The use of the vibration analysis method and the acoustic emission analysis method to analyze the position of the defect of the bearing is already a mature technology in the art, and therefore will not be described in detail herein.

For a second sub step of step S10, determine the size of the defect. The size of the defect is determined through the following steps S11 to S13:

- S11: determines a relative rotational speed of a rolling element of the bearing with respect to an inner race or outer race;
- S12: determines a time required for the rolling element to go through the defect; and
- S13: calculates the size of the defect according to the relative rotational speed and the time.

In step S11, during the determining of the relative rotational speed: first, the revolution speed of the rolling element, that is, the rotational speed of the rolling element rotating about the central axis of the bearing, is determined; and then the rotational speed of the component where the defect is located, for example, the rotational speed of the inner race or the outer race, is determined. Then, the relative rotational speed between the rolling element and the component where the defect is located is determined according to the rotational speed of the rolling element and the rotational speed of the component where the defect is located.

In step S12, a time required for the rolling element to go through the defect is determined by using a vibration analysis method, an acoustic emission analysis method or other analysis methods.

In the vibration analysis method, first, a vibration signal of the bearing is acquired, the vibration signal including a vibration frequency and amplitude of the bearing; and then, time domain analysis is performed on the vibration signal to determine the time required for the rolling element to go through the defect, the time being an interval between a moment at which the rolling element reaches the defect and a moment at which the rolling element leaves the defect.

As described above, the initially determined vibration signal is a time domain signal, that is, the distribution of the amplitude of vibration over the time. Time domain analysis is performed on the time domain signal. When the rolling element does not go through the defect region, the time domain signal of vibration substantially changes regularly. When the rolling element passes through the defect region, the time domain signal changes suddenly. In other words, within the period of time during which the time domain signal changes suddenly, the part that the rolling element passes through has a defect. Accordingly, the period of time the time required for the rolling element to go through the defect.

During analysis, a start time point and an end time point of the period of time during which the sudden change occurs is calculated according to the time domain signal, and then the time difference between the start time point and the end time point is determined as the time required for the rolling element to go through the defect.

In the acoustic emission analysis method, first, an acoustic emission signal of the bearing is acquired, the acoustic emission signal including a frequency and amplitude of an acoustic wave generated by the bearing; and then, time domain analysis is performed on the acoustic emission signal to determine the time required for the rolling element to go through the defect, the time being an interval between a moment at which the rolling element reaches the defect and a moment at which the rolling element leaves the defect.

As described above, the initially determined acoustic emission signal is a time domain signal, that is, the distribution of the amplitude of the acoustic wave over the time. When the rolling element does not go through the defect region, the acoustic wave signal is small. When the rolling element passes through the defect region, the acoustic wave signal changes suddenly. Accordingly, the period of time during which the sudden change occurs is the time required for the rolling element to go through the defect.

Further, in an example embodiment, before step S10, the monitoring method includes step S100: determining whether the bearing has a defect. If it is determined that the bearing has a defect, steps S10 to S30 are performed.

Specifically, in step S100, the process of determining whether the bearing has a defect includes:

S110: acquiring a value of an operating parameter of the bearing during the operation, the operating parameter of the bearing including one or more of temperature of the bearing, vibration frequency and amplitude of the bearing, and rotational speed of the bearing; and S120: determining that the bearing has a defect when one or more of the values of the operating parameters are abnormal.

Before the acquiring a value of an operating parameter of the bearing, the monitoring method further includes a step of detecting the value of the operating parameter of the bearing. For example, a temperature sensor may be used to detect the temperature of the bearing, a vibration acceleration sensor may be used to detect the vibration frequency and amplitude of the bearing, and a rotational speed sensor may be used to detect the rotational speed of the bearing.

Step S120 further includes a process of diagnosing whether the value of the operating parameter is abnormal. The process includes the following steps:

S121: A criterion value of the operating parameter is acquired. The criterion value generally refers to the value of each operating parameter acquired during the normal operation of the bearing. Generally, a period of time since the use of a new bearing or a period of time after maintenance is considered as the normal operation time of the bearing.

S122: The value of the operating parameter and the criterion value of the operating parameter are compared to obtain a difference, and when the difference exceeds a set range, it is determined that the operating parameter is abnormal.

Further, in step S100, if it is determined that the bearing does not have a defect, the remaining life of the bearing is calculated through the following steps S40 to S50.

S40: A load of the bearing is determined.

S50: The remaining life of the bearing is determined according to the load and a dynamic load rating of the bearing. The dynamic load rating can be determined by using a method specified in ISO 281 "Rolling bearings—Dynamic load ratings and rating life" (briefly referred to as ISO 281).

In step S40, the load may be an equivalent load or a real-time load. The equivalent load, or referred to as equivalent dynamic load, generally refers to an imaginary load which is derived from the load actually acting on the bearing and has the same direction as the basic dynamic load rating. The real-time load is the load that the bearing is actually subjected to at each moment during operation.

When the equivalent load is used as the load in step S40, step S40 further includes: determining an equivalent load on the bearing during the operation, and using the equivalent load as the load. When the real-time load is used as the load in step S40, step S40 further includes: determining a real-time load on the bearing during the operation, and using the real-time load as the load.

In step S50, before the remaining life of the bearing is calculated, the fatigue life of the bearing is calculated first. The fatigue life of the bearing can be calculated by using a general formula in existing industrial standards.

In an example embodiment, the fatigue life of the bearing is determined by using a general formula for the bearing life defined in ISO 281. The general formula is:

$$L_{nm} = a_1 a_{ISO} \left(\frac{C}{P}\right)^\varepsilon, \text{ where } a_{ISO} = f\left(\frac{e_c C_u}{P}, \kappa\right).$$

In the formula, $L_{nm}$, is the fatigue life of the bearing, $a_1$ is a life correction coefficient based on reliability, $a_{ISO}$ is a life correction coefficient based on factors such as lubrication, environment, contaminant particles and installation, $C_u$ is the fatigue load limit, $e_C$ is the contamination factor, κ is the viscosity ratio of the lubricant, P is the load on the bearing, for example, an equivalent dynamic load (that is, equivalent load) or a real-time load, and ε is an exponent determined according to the type of the rolling element of the bearing. According to ISO 281 "Rolling bearings—Dynamic load ratings and rating life", ε=3 when the rolling element is a ball, and $$\varepsilon = \frac{10}{3}$$

when the rolling element is a roller.

After the fatigue life of the bearing is calculated, the remaining life of the bearing can be determined according to the number of turns that the bearing has rotated. To sum up, FIG. 2 shows a flowchart of the method of this embodiment.

Figure 2:
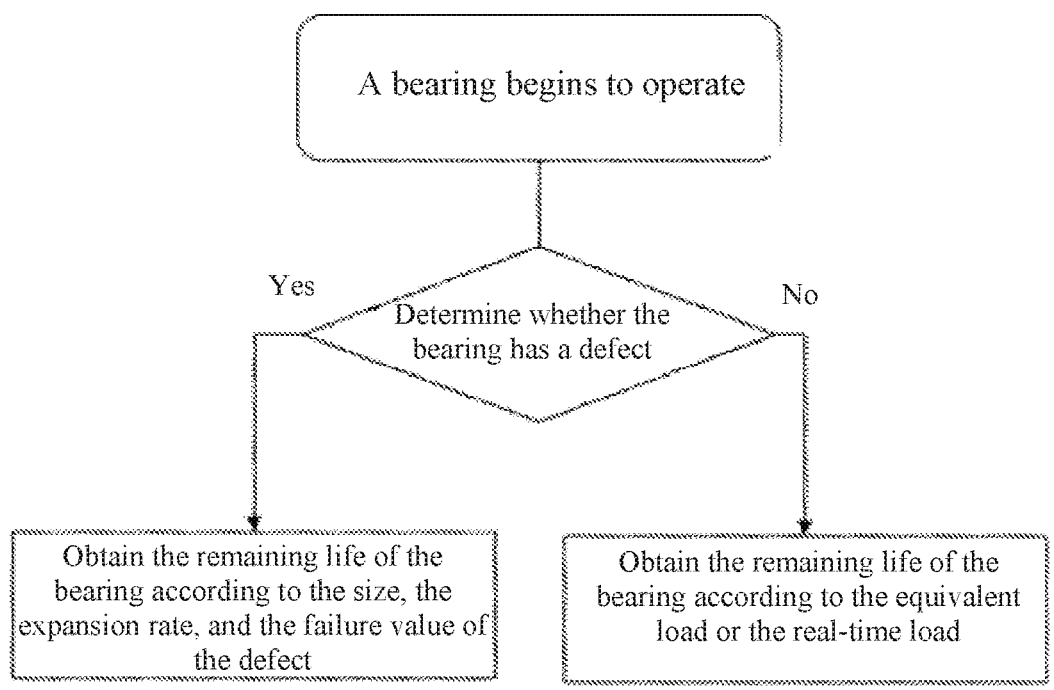
FIG. 2 is a flowchart of a monitoring method according to an embodiment of the present invention.

As can be seen from the flowchart in FIG. 2, when a bearing begins to operate, it is first determined whether the bearing has a defect. If the bearing has a defect, the remaining life of the bearing is determined according to the size, the expansion rate, and the failure value of the defect. That is, the remaining life is determined through step S10 to step S30. If the bearing has no defect, the remaining life of the bearing is determined according to the equivalent load or the real-time load. That is, the remaining life is determined through step S40 to step S50.

In some embodiments, if the method of this embodiment needs to be used for determining the remaining life of the bearing in the defect state, steps S40 to step S50 may be omitted.

Figure 3:
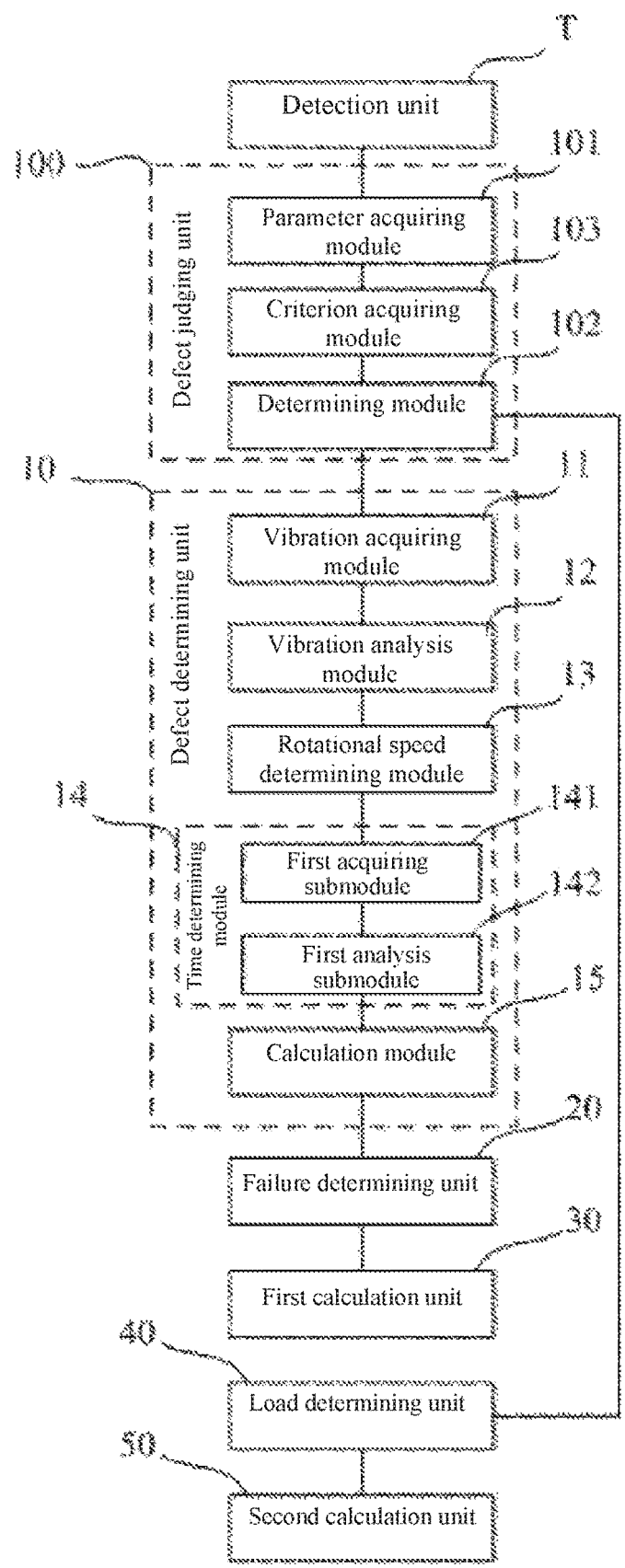
FIG. 3 is a principle diagram of a monitoring apparatus according to an embodiment of the present invention.

The present disclosure provides monitoring apparatus 1, for the remaining life of a bearing. Referring to FIG. 3, monitoring apparatus 1 includes: defect determining unit 10 configured to: during the operation of the bearing, determine the position where a defect of the bearing is located, and determine the size of the defect; failure determining unit 20 configured to: according to the position where the defect is located and a set condition, determine a failure mode of the bearing under a working condition during the operation as well as an expansion rate and a failure value of the defect in the failure mode, the failure value being a maximum value that the defect can reach when the bearing fails; and first calculation unit 30 configured to determine the remaining life of the bearing based on the size of the defect determined by the defect determining unit 10 and the expansion rate and the failure value determined by the failure determining unit 20.

First calculation unit 30 includes the following calculation formula: the bearing the remaining running time=(the failure value−the size of the defect)/the expansion rate. Then, the remaining life of the bearing, that is, the remaining number of turns the bearing can rotate is determined according to the remaining running time and the rotational speed of the bearing.

As described above, the position and the size of the defect can be determined by using a vibration analysis method, an acoustic emission analysis method, or other methods. When the vibration analysis method is used to determine the position of the defect, the defect determining unit 10 includes: vibration acquiring module 11 configured to acquire a vibration signal of the bearing, the vibration signal including a vibration frequency and amplitude of the bearing; and vibration analysis module 12 configured to perform frequency domain analysis on the vibration signal acquired by the vibration acquiring module 11 to determine the position where the defect is located.

To determine the size of the defect, the defect determining unit 10 includes: rotational speed determining module 13 configured to determine a relative rotational speed of a rolling element of the bearing with respect to an inner race or outer race; time determining module 14 configured to determine a time required for the rolling element to go through the defect; and calculation module 15 configured to calculate the size of the defect based on the relative rotational speed determined by the rotational speed determining module 13 and the time determined by the time determining module 14.

When the vibration analysis method is used to determine the size of the defect, the time determining module 14 includes: first acquiring submodule 141 configured to acquire a vibration signal of the bearing, the vibration signal including a vibration frequency and amplitude of the bearing; and first analysis submodule 142 configured to perform time domain analysis on the vibration signal acquired by the first acquiring submodule 141 to determine the time required for the rolling element to go through the defect, the time being an interval between a moment at which the rolling element reaches the defect and a moment at which the rolling element leaves the defect.

Figure 4:
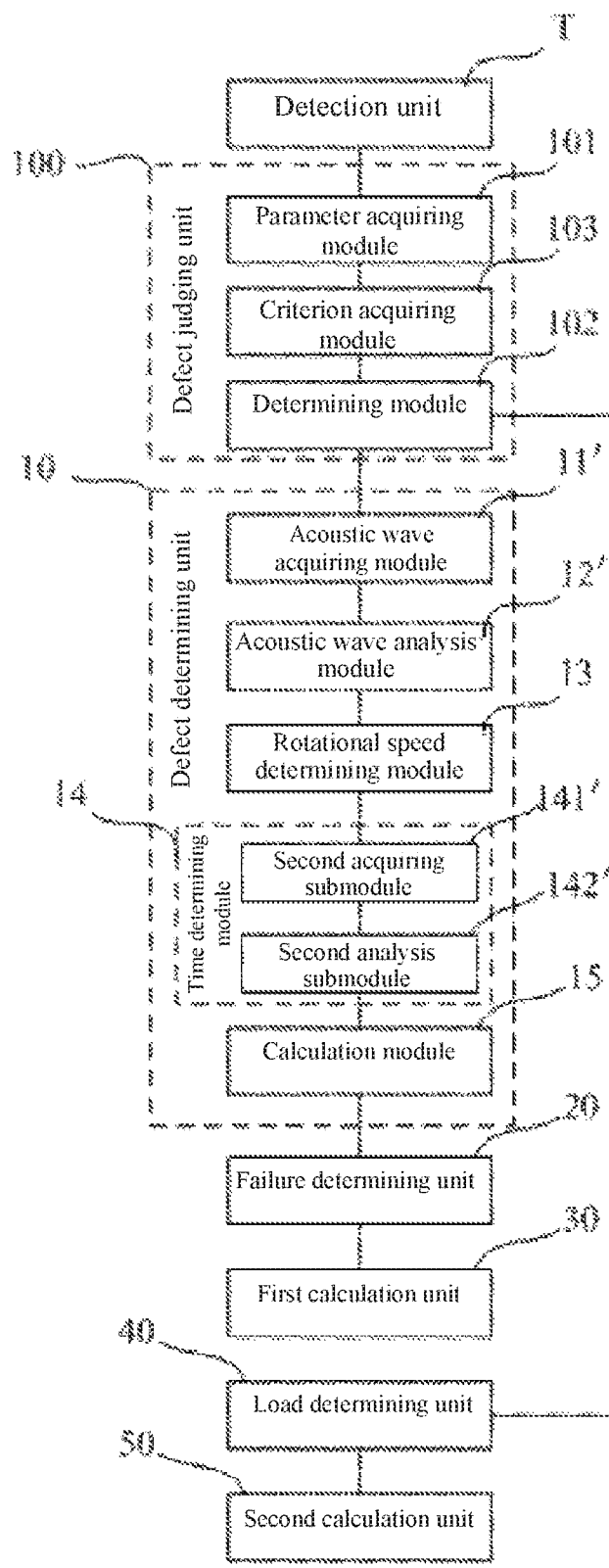
FIG. 4 is a principle diagram of a monitoring apparatus of a variant embodiment according to an embodiment of the present invention.

In some embodiments, referring to FIG. 4, when the position and the size of the defect of the bearing are determined by using the acoustic emission analysis method to determine the position of the defect, the defect determining unit 10 includes: acoustic wave acquiring module 11' configured to acquire an acoustic emission signal of the bearing, the acoustic emission signal including a frequency and amplitude of an acoustic wave generated by the bearing; and acoustic wave analysis module 12' configured to perform frequency domain analysis on the acoustic emission signal acquired by the acoustic wave acquiring module to determine the position where the defect is located.

When the acoustic emission analysis method is used, as shown in FIG. 4 to determine the size of the defect, the time determining module 14 includes: second acquiring submodule 141' configured to acquire an acoustic emission signal of the bearing, the acoustic emission signal including a frequency and amplitude of an acoustic wave generated by the bearing; and second analysis submodule 142' configured to perform frequency domain analysis on the acoustic emission signal acquired by the second acquiring submodule 141' to determine the time required for the rolling element to go through the defect, the time being an interval between a moment at which the rolling element reaches the defect and a moment at which the rolling element leaves the defect.

Referring to FIG. 3, during the operation of the bearing, if it is not known whether the bearing already has a defect, monitoring apparatus 1 includes a defect judging unit 100 configured to determine whether the bearing has a defect. The defect judging unit 100 includes: parameter acquiring module 101 configured to acquire a value of an operating parameter of the bearing during the operation of the bearing, the parameter including one or more of temperature of the bearing, vibration frequency and amplitude of the bearing, and rotational speed of the bearing; and determining module 102 configured to determine that the bearing has a defect when one or more of the values of the operating parameters acquired by the parameter acquiring module 101 are abnormal.

To determine the value of the operating parameter during the operation of the bearing, monitoring apparatus 1 includes detection unit T configured to detect the value of the operating parameter of the bearing before the value of the operating parameter of the bearing is acquired. In an example embodiment, detection unit T includes a temperature sensor, a vibration acceleration sensor, a rotational speed sensor or the like, to detect the temperature of the bearing, the vibration frequency and amplitude of the bearing, and the rotational speed of the bearing, and transmit the detected signal to the parameter acquiring module 101.

To determine a criterion value of the operating parameter of the bearing and determine whether the value of the operating parameter is abnormal: defect judging unit 100 includes criterion acquiring module 103 configured to acquire a criterion value of the operating parameter; and determining module 102 is configured to compare the value of the operating parameter of the bearing acquired during the operation of the bearing and the criterion value of the operating parameter acquired by the criterion acquiring module 103 to determine a difference, and when the difference exceeds a set range, determine that the operating parameter is abnormal.

If determining module 102 determines that the bearing has a defect, the remaining life of the bearing is calculated by using defect determining unit 10, failure determining unit 20, and first calculation unit 30. If determining unit 102 determines that the bearing has no defect, the remaining life is calculated according to the load of the bearing.

Specifically, monitoring apparatus 1 includes load determining unit 40 and second calculation unit 50, to calculate the remaining life of the bearing when there is no defect.

Load determining unit 40 is configured to determine a load of the bearing when the bearing has no defect. Second calculation unit 50 is configured to determine the remaining life of the bearing according to the load determined by the load determining unit 40 and a dynamic load rating of the bearing.

The load may be an equivalent load or a real-time load. Therefore, if the equivalent load is used as the load for calculating the remaining life, load determining unit 40 is configured to determine an equivalent load on the bearing during the operation, and use the equivalent load as the load.

If the real-time load is used as the load for calculating the remaining life, load determining unit 40 is further configured to determine a real-time load on the bearing during the operation, and use the real-time load as the load.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A monitoring method for determining a remaining life of a bearing, comprising:
   during operation of the bearing, determining:
      a position where a defect of the bearing is located; and
      a size of the defect;
   according to the position where the defect is located and a set condition, determining:
      a failure mode of the bearing;
      an expansion rate of the defect in the failure mode; and
      a failure value of the defect in the failure mode, the failure value being a maximum value that the defect can reach when the bearing fails; and
   based on the size, the expansion rate and the failure value of the defect, calculating a remaining life of the bearing.

2. The monitoring method according to claim 1, wherein determining the position where the defect of the bearing is located comprises:
   acquiring a vibration signal of the bearing, the vibration signal comprising:
      a vibration frequency of the bearing; and
      a vibration amplitude of the bearing; and
   performing a frequency domain analysis on the vibration signal to determine the position where the defect is located.

3. The monitoring method according to claim 1, wherein determining the position where the defect of the bearing is located comprises:
   acquiring an acoustic emission signal of the bearing, the acoustic emission signal comprising:
      a frequency of an acoustic wave generated by the bearing; and
      an amplitude of the acoustic wave generated by the bearing; and
   performing a frequency domain analysis on the acoustic emission signal to determine the position where the defect is located.

4. The monitoring method according to claim 1, wherein determining the size of the defect comprises:
   determining a relative rotational speed of a rolling element of the bearing with respect to an inner race of the bearing or an outer race of the bearing;
   determining a time required for the rolling element to go through the defect; and
   calculating the size of the defect according to the relative rotational speed and the time.

5. The monitoring method according to claim 4, wherein determining the time required for the rolling element to go through the defect comprises:
   acquiring a vibration signal of the bearing, the vibration signal comprising:
      a vibration frequency of the bearing and an amplitude of the bearing; and
   performing a time domain analysis on the vibration signal to determine a time required for the rolling element to go through the defect, the time being an interval between a moment at which the rolling element reaches the defect and a moment at which the rolling element leaves the defect.

6. The monitoring method according to claim 4, wherein determining the time required for the rolling element to go through the defect comprises:
   acquiring an acoustic emission signal of the bearing, the acoustic emission signal comprising:
      a frequency of an acoustic wave generated by the bearing; and
      an amplitude of the acoustic wave generated by the bearing; and
   performing a time domain analysis on the acoustic emission signal to determine the time required for the rolling element to go through the defect, the time being an interval between a moment at which the rolling element reaches the defect and a moment at which the rolling element leaves the defect.

7. The monitoring method according to claim 1, further comprising, before determining the position where the defect of the bearing is located, and before determining the size of the defect:

determining whether the bearing has the defect by:
  detecting a value of an operating parameter of the bearing, the operating parameter of the bearing comprising one or more of a temperature of the bearing, a vibration frequency of the bearing, an amplitude of the bearing, and a rotational speed of the bearing;
  acquiring the value of the operating parameter of the bearing during an operation of the bearing;
  acquiring a criterion value of the operating parameter;
  diagnosing whether the value of the operating parameter is abnormal by:
    comparing the value of the operating parameter and the criterion value of the operating parameter to obtain a difference; and
    when the difference exceeds a set range, determining that the operating parameter is abnormal; and
  determining that the bearing has a defect when one or more of the values of the operating parameters are abnormal.

8. The monitoring method according to claim 7, further comprising:
  when the bearing has no defect,
    determining a load of the bearing, and
    calculating the remaining life of the bearing according to the load and a dynamic load rating of the bearing.

9. The monitoring method according to claim 8, wherein determining the load of the bearing comprises:
  determining an equivalent load on the bearing during the operation; and
  using the equivalent load as the load.

10. The monitoring method according to claim 8, wherein determining the load of the bearing comprises:
  determining a real-time load on the bearing during the operation; and
  using the real-time load as the load.

11. A monitoring apparatus for determining a remaining life of a bearing, comprising:
  a defect determining unit configured to, during an operation of the bearing, determine:
    a position where a defect of the bearing is located; and
    determine a size of the defect;
  a failure determining unit configured to, according to the position where the defect is located and a set condition, determine:
    a failure mode of the bearing;
    an expansion rate of the defect in the failure mode; and
    a failure value of the defect in the failure mode, the failure value being a maximum value that the defect can reach when the bearing fails; and
  a first calculation unit configured to obtain the remaining life of the bearing based on:
    the size of the defect determined by the defect determining unit;
    the expansion rate of the defect in the failure mode determined by the failure determining unit; and
    the failure value determined by the failure determining unit.

12. The monitoring apparatus according to claim 11, wherein the defect determining unit comprises:
  a vibration acquiring module configured to acquire a vibration signal of the bearing, the vibration signal comprising a vibration frequency of the bearing and amplitude of the bearing;
  a vibration analysis module configured to perform frequency domain analysis on the vibration signal acquired by the vibration acquiring module to determine the position where the defect is located;
  an acoustic wave acquiring module configured to acquire an acoustic emission signal of the bearing, the acoustic emission signal comprising a frequency of an acoustic wave generated by the bearing and amplitude of the acoustic wave generated by the bearing; and,
  an acoustic wave analysis module configured to perform a frequency domain analysis on the acoustic emission signal acquired by the acoustic wave acquiring module to determine the position where the defect is located.

13. The monitoring apparatus according to claim 11, wherein the defect determining unit further comprises:
  a rotational speed determining module configured to determine a relative rotational speed of a rolling element of the bearing with respect to an inner race or outer race of the bearing;
  a time determining module configured to determine a time required for the rolling element to go through the defect; and
  a calculation module configured to calculate the size of the defect based on the relative rotational speed determined by the rotational speed determining module and the time determined by the time determining module.

14. The monitoring apparatus according to claim 13, wherein the time determining module comprises:
  a first acquiring submodule configured to acquire a vibration signal of the bearing, the vibration signal comprising a vibration frequency of the bearing and an amplitude of the bearing; and
  a first analysis submodule configured to perform a time domain analysis on the vibration signal acquired by the first acquiring submodule to determine a time required for the rolling element to go through the defect, the time being an interval between a moment at which the rolling element reaches the defect and a moment at which the rolling element leaves the defect.

15. The monitoring apparatus according to claim 13, wherein the time determining module comprises:
  a second acquiring submodule configured to acquire an acoustic emission signal of the bearing, the acoustic emission signal comprising a frequency of an acoustic wave generated by the bearing and an amplitude of the acoustic wave generated by the bearing; and
  a second analysis submodule configured to perform a time domain analysis on the acoustic emission signal acquired by the second acquiring submodule to determine a time required for the rolling element to go through the defect, the time being an interval between a moment at which the rolling element reaches the defect and a moment at which the rolling element leaves the defect.

16. The monitoring apparatus according to claim 11, further comprising:
  a defect judging unit configured to determine whether the bearing has a defect and
  a detection unit, wherein:
    the defect judging unit comprises:
      a parameter acquiring module configured to acquire a value of an operating parameter of the bearing during an operation of the bearing, the parameter comprising one or more of temperature of the bearing, a vibration frequency of the bearing, an amplitude of the bearing, and a rotational speed of the bearing; and
      a determining module configured to determine that the bearing has a defect when one or more of the values of the operating parameters acquired by the parameter acquiring module are abnormal; and the detection unit is configured to detect the value of the operating parameter of the bearing before the value of the operating parameter of the bearing is acquired.

17. The monitoring apparatus according to claim 16, wherein:
the defect judging unit further comprises a criterion acquiring module configured to acquire a criterion value of the operating parameter; and
the determining module is further configured to compare the value of the operating parameter of the bearing acquired during the operation of the bearing and the criterion value of the operating parameter acquired by the criterion acquiring module to obtain a difference, and when the difference exceeds a set range, determine that the operating parameter is abnormal.

18. The monitoring apparatus according to claim 16, further comprising:
a load determining unit configured to determine a load of the bearing when the bearing has no defect; and
a second calculation unit configured to obtain a remaining life of the bearing according to the load determined by the load determining unit and a dynamic load rating of the bearing.

19. The monitoring apparatus according to claim 18, wherein:
the load determining unit is further configured to determine an equivalent load on the bearing during the operation, and use the equivalent load as the load; or
the load determining unit is further configured to determine a real-time load on the bearing during the operation, and use the real-time load as the load.

20. A monitoring apparatus for a remaining life of a bearing, comprising:
a defect determining unit configured to, during an operation of the bearing, determine:
a position where a defect of the bearing is located; and
a size of the defect;
a failure determining unit configured to, according to the position where the defect is located and a set condition, determine:
a failure mode of the bearing;
an expansion rate of the defect in the failure mode; and
a failure value of the defect in the failure mode, the failure value being a maximum value that the defect can reach when the bearing fails;
a first calculation unit configured to obtain the remaining life of the bearing based on:
the size of the defect determined by the defect determining unit;
the expansion rate of the defect in the failure mode determined by the failure determining unit; and
the failure value determined by the failure determining unit;
a detection unit configured to detect and then acquire a value of an operating parameter of the bearing, the operating parameter comprising one or more of temperature of the bearing, vibration frequency and amplitude of the bearing, and rotational speed of the bearing;
a defect judging unit configured to determine whether the bearing has a defect when one or more of the values of the operating parameters acquired by the detection unit are abnormal;
a load determining unit configured to determine a load of the bearing when the bearing has no defect; and
a second calculation unit configured to obtain the remaining life of the bearing according to the load determined by the load determining unit and a dynamic load rating of the bearing.

\* \* \* \* \*